US010212715B2

(12) United States Patent
Sihlbom (10) Patent No.: US 10,212,715 B2
(45) Date of Patent: Feb. 19, 2019

(54) CHANNEL ESTIMATION IN WIRELESS COMMUNICATION NETWORK NODE (71) Applicant: HUAWEI TECHNOLOGIES CO., LTD., Shenzhen (CN)

(72) Inventor: Björn Sihlbom, Gothenburg (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 15/345,633

(22) Filed: Nov. 8, 2016

(65) Prior Publication Data
US 2017/0079051 A1  Mar. 16, 2017

Related U.S. Application Data (63) Continuation of application No. PCT/EP2014/059401, filed on May 8, 2014.

(51) Int. Cl.
*H04W 72/08* (2009.01)
*H04L 25/02* (2006.01)
(Continued)

(52) U.S. Cl.
CPC ........ *H04W 72/082* (2013.01); *H04B 7/0452* (2013.01); *H04B 7/0854* (2013.01);
(Continued)

(58) Field of Classification Search
CPC .. H04B 7/0452; H04B 7/0854; H04B 7/2121; H04B 7/2123; H04L 25/0224;
(Continued)

(56) References Cited

U.S. PATENT DOCUMENTS 5,694,133 A * 12/1997 Ghose ............... H01Q 3/22
                                                      342/372
5,933,421 A *  8/1999 Alamouti ........... H04B 7/0837
                                                      370/203

(Continued)

FOREIGN PATENT DOCUMENTS

CN  101322327 A  12/2008
CN  101356748 A   1/2009
(Continued)

OTHER PUBLICATIONS

Takashi Kataoka et al.: "Comparison of Path-Independent Weight Generation Method with Path-Common One by Field Experiments on Adaptive Antenna Array-Beam Forming Receiver for Broadband DS-CDMA Wireless Access in Reverse Link," Proceedings 1 of the IEICE Communications Society Conference 2004, Sep. 8, 2004, p. 451, B-5-117.

(Continued)

*Primary Examiner* — Robert J Lopata
(74) *Attorney, Agent, or Firm* — Staas & Halsey LLP (57) ABSTRACT

Radio network node and method therein, for channel estimation of a channel used for wireless signal communication with a UE. The radio network node comprises a multiple antenna array configured for beamforming, spatial multiplexing and MIMO transmission. The radio network node also comprises a receiver, configured for receiving a first pilot signal from the UE, and a wireless signal from an interferer; and also configured for receiving a second pilot signal from the UE at a determined AoA, filtered by a receiver pre-filter; and a processor configured for spatial analyzing the received signals; and selecting the UE pilot signals; and configured for determining AoA for the selected pilot signals; and furthermore configured for designing a receiver pre-filter, for isolating signals from the AoA; and (Continued)

also further configured for estimating the channel, based on the received second pilot signal.

13 Claims, 5 Drawing Sheets

(51) Int. Cl.
*H04B 7/08* (2006.01)
*H04B 7/0452* (2017.01)
*H04L 5/00* (2006.01)
*H04W 72/04* (2009.01)
*H04W 72/12* (2009.01)

(52) U.S. Cl.
CPC .......... *H04L 5/0035* (2013.01); *H04L 5/0051* (2013.01); *H04L 25/0224* (2013.01); *H04L 25/0228* (2013.01); *H04L 25/0226* (2013.01); *H04W 72/046* (2013.01); *H04W 72/1231* (2013.01)

(58) Field of Classification Search
CPC ............. H04L 25/0226; H04L 25/0228; H04L 5/0035; H04L 5/0051; H04W 72/046; H04W 72/082; H04W 72/1231; H04W 72/04; H04W 72/12; H04W 76/00; H04J 2203/0069; H04Q 2213/394
USPC ......................................................... 370/329
See application file for complete search history.

(56) References Cited

U.S. PATENT DOCUMENTS

| | | | |
|---|---|---|---|
| 6,091,788 A | 7/2000 | Keskitalo et al. | |
| 6,147,640 A * | 11/2000 | Wachs ...................... | G01S 3/46 342/352 |
| 2003/0146870 A1 | 8/2003 | Guo et al. | |
| 2003/0156061 A1 | 8/2003 | Ohira | |
| 2006/0246863 A1* | 11/2006 | Reed ........................ | H04B 7/086 455/276.1 |
| 2007/0070954 A1 | 3/2007 | Kim et al. | |
| 2007/0147536 A1* | 6/2007 | Melzer ................. | H04B 7/0417 375/267 |
| 2007/0160156 A1* | 7/2007 | Melzer ................. | H04B 7/0417 375/260 |
| 2008/0274692 A1 | 11/2008 | Larsson | |
| 2010/0157909 A1 | 6/2010 | Miura et al. | |
| 2010/0232553 A1* | 9/2010 | Gomadam ........... | H04B 7/0413 375/346 |
| 2011/0013711 A1* | 1/2011 | Wang .................. | H04B 7/0439 375/267 |
| 2011/0090980 A1* | 4/2011 | Okino .................. | H04B 7/0434 375/267 |
| 2011/0235728 A1* | 9/2011 | Karabinis ................. | H03F 3/24 375/260 |
| 2011/0305262 A1 | 12/2011 | Medles | |
| 2011/0312355 A1 | 12/2011 | Cheng et al. | |
| 2012/0218139 A1* | 8/2012 | Suzuki ...................... | G01S 3/74 342/189 |
| 2012/0288022 A1* | 11/2012 | Guey .................... | H04B 7/0691 375/267 |
| 2013/0182785 A1* | 7/2013 | Koifman ............... | H04L 5/0023 375/267 |
| 2014/0140289 A1* | 5/2014 | Moulsley .............. | H04L 5/0053 370/329 |
| 2014/0218240 A1* | 8/2014 | Kpodzo ................. | G01S 19/21 342/450 |
| 2014/0219377 A1* | 8/2014 | Guey .................... | H04B 7/0691 375/267 |
| 2015/0222395 A1 | 8/2015 | Suzuki et al. | |
| 2015/0358103 A1* | 12/2015 | Ohwatari ................. | H04J 11/00 370/252 |
| 2016/0135210 A1* | 5/2016 | Nammi ............. | H04W 72/1231 370/329 |
| 2016/0204919 A1* | 7/2016 | Lidian ................... | H04L 5/0048 370/329 |
| 2016/0373188 A1* | 12/2016 | Lambert ............. | H04L 41/0813 |

FOREIGN PATENT DOCUMENTS

| | | |
|---|---|---|
| CN | 102273088 A | 12/2011 |
| EP | 0872037 B1 | 9/2002 |
| JP | 11-505969 | 5/1999 |
| JP | 2004-505539 | 2/2004 |
| JP | 3730194 | 10/2005 |
| JP | 2009-206833 | 9/2009 |
| JP | 5075359 | 8/2012 |
| JP | 2013-534776 | 9/2013 |
| WO | 01/65725 | 9/2001 |
| WO | 02/11311 | 2/2002 |
| WO | 2014/045834 A1 | 3/2014 |

OTHER PUBLICATIONS

Japanese Office Action dated Sep. 12, 2017 in corresponding Japanese Patent Application No. 2016-566948.
International Search Report dated Mar. 3, 2015 in corresponding International Application No. PCT/EP2014/059401.
International Search Report dated Mar. 25, 2015 in corresponding International Patent Application No. PCT/EP2014/059401.
Alexei Ashikhmin et al. "Pilot Contamination Precoding in Multi-Cell Large Scale Antenna Systems" Bell Laboratories, IEEE International Symposium on Information Theory Proceedings, 2012.
Erik G. Larsson et al. "Massive MIMO for Next Generation Wireless Systems" IEEE Communications Magazine, Feb. 2014.
Office Action, dated Oct. 29, 2018, in Chinese Application No. 201480078198.3 (8 pp.).

* cited by examiner

Fig. 5

CHANNEL ESTIMATION IN WIRELESS COMMUNICATION NETWORK NODE

CROSS-REFERENCE TO RELATED APPLICATIONS

This application is a continuation of International Application No. PCT/EP2014/059401, filed on May 8, 2014, the disclosure of which is hereby incorporated by reference in its entirety.

TECHNICAL FIELD

Implementations described herein generally relate to a radio network node, a method in a radio network node, a computer program product and a coordinated multipoint scheme for orthogonal pilot signal scheduling. In particular, a mechanism is herein described for channel estimation of a channel used for wireless signal communication between a user equipment and the radio network node in a wireless communication system comprising Massive MIMO

BACKGROUND

A User Equipment (UE), also known as a mobile station, wireless terminal and/or mobile terminal is enabled to communicate wirelessly in a wireless communication network, sometimes also referred to as a cellular radio system. The communication may be made, e.g., between user equipments, between a user equipment and a wire connected telephone and/or between a user equipment and a server via a Radio Access Network (RAN) and possibly one or more core networks. The wireless communication may comprise various communication services such as voice, messaging, packet data, video, broadcast, etc The user equipment may further be referred to as mobile telephone, cellular telephone, computer tablet or laptop with wireless capability, etc. The user equipment in the present context may be, for example, portable, pocket-storable, hand-held, computer-comprised, or vehicle-mounted mobile devices, enabled to communicate voice and/or data, via the radio access network, with another entity, such as another user equipment, a stationary entity or a server.

The wireless communication network covers a geographical area which is divided into cell areas, with each cell area being served by a radio network node or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the radio network node itself. However, the cell may also in normal terminology be used for the geographical area where radio coverage is provided by the radio network node at a base station site. One radio network node, situated on the base station site, may serve one or several cells. The radio network nodes may communicate over the air interface operating on radio frequencies with any user equipment within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), radio network nodes, which may be referred to as eNodeBs or eNBs, may be connected to a gateway, e.g., a radio access gateway, to one or more core networks. LTE is based on the GSM/EDGE and UMTS/HSPA network technologies, increasing the capacity and speed using a different radio interface together with core network improvements.

LTE-Advanced, i.e. LTE Release10 and later releases are set to provide higher bitrates in a cost efficient way and, at the same time, completely fulfil the requirements set by International Telecommunication Union (ITU) for the International Mobile Telecommunications (IMT)-Advanced, sometimes also referred to as 4G (abbreviation for "fourth generation"). Beyond 3G mobile communication systems, such as e.g., 3GPP LTE, offer high data rate in the downlink by employing multiple antenna systems utilising Multiple-Input and Multiple-Output (MIMO).

Massive MIMO is a new technology that uses large Antenna Arrays Systems (AAS) with individual transceivers to dramatically improve throughput of wireless communication systems. The benefit of these large arrays is the ability to spatially resolve and separate received and transmitted signals with very high resolution. Typical limitation factors like Noise and Interference is reduced to the extent that previously negligible effects become limiting. One of the most difficult of these effects is Pilot Contamination. Pilot Contamination is caused by lost or lack of training sequence orthogonality between cells.

Massive MIMO is sometimes loosely defined as a system comprising e.g. 100 or more transceivers. Various investigations in this community have shown Massive MIMO systems that benefit from several hundred's of transceivers.

A Massive MIMO enabled radio network node estimates the radio channel from user equipments by correlating the received signal with a known signal transmitted by the user equipments, i.e. pilot signals. These pilot signals are made orthogonal to each other. This means that the result of correlation performed by the radio network node during training will only contain a systematic response from desired link form the mobile transmitting the pilot used in the correlation.

In the present context, the expressions downlink, downstream link or forward link may be used for the transmission path from the radio network node to the user equipment. The expression uplink, upstream link or reverse link may be used for the transmission path in the opposite direction, i.e., from the user equipment to the radio network node.

However, there are only a limited set of orthogonal pilot signals available. This means that the same pilot signal has to be reused to provide enough training time and accurate channel estimations. This will cause increased pilot contamination within the cell, which will deteriorate the signal quality and thereby also the signalling throughput within the wireless communication system.

Therefore, it is desired to reduce the problems with pilot contamination in Massive MIMO systems, in order to make use of such systems feasible.

SUMMARY

It is therefore an object to obviate at least some of the above mentioned disadvantages and reduce the problems with pilot contamination in Massive MIMO and provide channel estimation of a channel used for wireless signal communication between a user equipment and the radio network node in a wireless communication system.

This and other objects are achieved by the features of the appended independent claims. Further implementation forms are apparent from the dependent claims, the description and the figures.

According to a first aspect, a radio network node is provided, configured for channel estimation of a channel used for wireless signal communication between a user equipment and the radio network node in a wireless communication system. The radio network node comprises a multiple antenna array configured for beamforming, spatial multiplexing and Multiple Input Multiple Output (MIMO) transmission. The radio network node comprises a receiver, configured for receiving a first pilot signal from the user equipment, and a wireless signal from an interferer. The receiver is also configured for receiving a second pilot signal from the user equipment at a determined angle of arrival, filtered by a receiver pre-filter. Furthermore, the radio network node comprises a processor configured for spatial analysing the received signals. The processor is also configured for selecting pilot signals from the user equipment, based on the spatial analysis. Further, the processor is additionally configure for determining an angle of arrival for the selected pilot signals. In addition, the processor is furthermore configured for designing a receiver pre-filter, for isolating signals received from the determined angle of arrival; and also further configured for estimating the channel, based on the received second pilot signal.

Thereby, an improved channel estimation may be made within the cell, as pilot signals from a user equipment may be filtered out and distinguished from wireless signals transmitted by an interferer. Thus problems associated with pilot contamination in a massive MIMO environment is omitted or at least reduced.

In a first possible implementation of the radio network node according to the first aspect, the processor may be further configured for determining visibility range of arrival for the selected signals; and also configured for designing the receiver pre-filter by isolating pilot signals received from the determined visibility range of arrival.

An advantage therewith comprises further improved channel estimation, as disturbing signals transmitted by the interferer may be filtered out with improved precision.

In a second possible implementation of the radio network node according to the first aspect, or the first possible implementation of the first aspect, the processor may also be configured for spatial analysing the received signals by comparing the received signal strength with a predetermined threshold value, and also configured for selecting the signals having a signal strength exceeding the predetermined threshold value.

Thereby, the uplink signals transmitted by the user equipment may be filtered out and detected with further improved precision.

In a third possible implementation of the radio network node according to the first aspect, or any of the previous implementations of the first aspect, the first pilot signal of the user equipment may be comprised in a set of orthogonal pilot signals coordinated between the radio network node and a neighbour network node, and the second pilot signal is not comprised in the set of orthogonal pilot signals coordinated between the radio network node and a neighbour network node.

An advantage according to such implementation is that the limited amount of available orthogonal pilot signals may be dedicated for the first pilot signal, while an arbitrary, not necessarily orthogonal pilot signal, may be used for the second pilot signal. Thereby, pilot contamination is avoided without requirement of additional amount of orthogonal signals. Thereby pilot signals may be reused, which enables use of a limited amount of available orthogonal pilot signals.

In a fourth possible implementation of the radio network node according to the first aspect, or any of the previous implementations of the first aspect, the first pilot signal of the user equipment is a Sounding Reference Signal (SRS) and wherein scheduling of the first pilot signal may be coordinated between the radio network node and the neighbour network node. Further, the second pilot signal of the user equipment may be a demodulation reference signal (DMRS) or an SRS, which is not required to be coordinated between the radio network node and the neighbour network node.

Thereby, an improved channel estimation may be made as problems associated with pilot contamination in a massive MIMO environment is omitted or at least reduced.

In a fifth possible implementation of the radio network node according to the first aspect, or any of the previous implementations, the design of the receiver pre-filter may be based on blind estimations and/or statistics.

An advantage of using blind estimations/statistics is that any received signals may be utilised for the pre-filtering rendering a further improved channel estimation and reduction of pilot contamination.

In a sixth possible implementation of the radio network node according to the first aspect, or any of the previous implementations, the design of the receiver pre-filter may be model based, e.g. based on matched filter signal strength measurements on the first pilot signal received from the user equipment.

An advantage of using a matched filter tuned for known reference signals such as pilot signals is that interferers may be filtered out, according to some embodiments. Thereby, an improved signal quality of the signal received in the uplink from the user equipment may be achieved.

In a seventh possible implementation of the radio network node according to the first aspect, or any of the previous implementations, the multiple antenna array may comprise a multitude of antenna elements, mounted at a distance from each other such that at least some of the antenna elements are able to receiving the same signal from the user equipment.

Thereby, an improved signal filtering mechanism is provided.

In an eighth possible implementation of the radio network node according to the first aspect, or any of the previous implementations, the radio network node may comprise an evolved NodeB (eNodeB) and wherein the wireless communication network may be based on 3rd Generation Partnership Project Long Term Evolution (3GPP LTE).

Thus massive MIMO and channel estimation according to the disclosed method may be provided also in an existing network and network elements, solving problems associated with pilot contamination.

According to a second aspect, a method is provided, for use in a radio network node. The method aims at providing channel estimation of a channel used for wireless signal communication between a user equipment and the radio network node in a wireless communication system, which radio network node comprises a multiple antenna array configured for beamforming, spatial multiplexing and MIMO transmission. The method comprises receiving a first pilot signal from the user equipment, and a wireless signal from an interferer. Further the method comprises spatial analysing the received signals. In addition, the method comprises selecting the pilot signal from the user equipment, based on the spatial analysis. Also, the method comprises determining an angle of arrival for the selected pilot signal. The method in addition comprises designing a receiver pre-filter, for isolating signals received from the determined angle of arrival. Furthermore, the method in addition also comprises receiving a second pilot signal from the user equipment at the determined angle of arrival, filtered by the designed receiver pre-filter; and also estimating the channel, based on the received second pilot signal.

Thereby, an improved channel estimation may be made within the cell, as pilot signals from a user equipment may be filtered out and distinguished from wireless signals transmitted by an interferer. Thus problems associated with pilot contamination in a massive MIMO environment is omitted or at least reduced.

In a first possible implementation of the method according to the second aspect, the method in addition may comprise determining visibility range of arrival for the selected pilot signal; and wherein the design of the receiver pre-filter may be further made for isolating pilot signals received from the determined visibility range of arrival.

An advantage therewith comprises further improved channel estimation, as disturbing signals transmitted by the interferer may be filtered out with improved precision.

In a second possible implementation of the method according to the second aspect, or the first possible implementation thereof, the spatial analysis of the received signals comprises a comparison of the received signal strength with a predetermined threshold value, and wherein the signals having a signal strength exceeding the predetermined threshold value are selected.

Thereby, the uplink signals transmitted by the user equipment may be filtered out and detected with further improved precision.

In a third possible implementation of the method according to the second aspect, or any previous implementation thereof, the first pilot signal of the user equipment may be comprised in a set of orthogonal pilot signals coordinated between the radio network node and a neighbour network node, and the second pilot signal may be not comprised in the set of orthogonal pilot signals coordinated between the radio network node and a neighbour network node.

An advantage according to such implementation is that the limited amount of available orthogonal pilot signals may be dedicated for the first pilot signal, while an arbitrary, not necessarily orthogonal pilot signal, may be used for the second pilot signal. Thereby, pilot contamination is avoided without requirement of additional amount of orthogonal signals. Thereby pilot signals may be reused, which enables use of a limited amount of available orthogonal pilot signals.

In a fourth possible implementation of the method according to the second aspect, or any previous implementation thereof, the first pilot signal of the user equipment may be a Sounding Reference Signal (SRS) and wherein scheduling of the first pilot signal may be coordinated between the radio network node and the neighbour network node. The second pilot signal of the user equipment may be a demodulation reference signal (DMRS) or an SRS, which may not be required to be coordinated between the radio network node and the neighbour network node.

An advantage according to such implementation comprises improved channel estimation may be made as problems associated with pilot contamination in a massive MIMO environment is omitted or at least reduced.

In a fifth possible implementation of the method according to the second aspect, or any previous implementation thereof, the design of the receiver pre-filter may be based on blind estimations and/or statistics.

An advantage of using blind estimations/statistics is that any received signals may be utilised for the pre-filtering rendering a further improved channel estimation and reduction of pilot contamination.

In a sixth possible implementation of the method according to the second aspect, or any previous implementation thereof, the design of the receiver pre-filter is model based, e.g. based on matched filter signal strength measurements on the first pilot signal received from the user equipment.

An advantage of using a matched filter tuned for known reference signals such as pilot signals is that interferers may be filtered out, according to some embodiments. Thereby, an improved signal quality of the signal received in the uplink from the user equipment may be achieved.

In a seventh possible implementation of the method according to the second aspect, or any previous implementation thereof, the multiple antenna array may comprise a multitude of antenna elements, mounted at a distance from each other such that at least some of the antenna elements are able to receiving the same signal from the user equipment.

Thereby, an improved signal filtering mechanism is provided.

In an eighth possible implementation of the method according to the second aspect, or any previous implementation thereof, the radio network node may comprise an evolved NodeB (eNodeB), and wherein the wireless communication network may be based on 3rd Generation Partnership Project Long Term Evolution (3GPP LTE).

Thus massive MIMO and channel estimation according to the disclosed method may be provided also in an existing network and network elements, solving problems associated with pilot contamination.

According to a further aspect, a computer program comprising program code for performing a method in a radio network node according to the second aspect, or any implementation of the second aspect, for channel estimation of a channel used for wireless signal communication between a user equipment and the radio network node in a wireless communication system, which radio network node comprises a multiple antenna array configured for beamforming, spatial multiplexing and MIMO transmission, when the computer program is loaded into a processor of the radio network node, according to the first aspect, or any implementation of the first aspect.

Thereby, improved channel estimation may be made within the cell, as pilot signals from a user equipment may be filtered out and distinguished from wireless signals transmitted by an interferer. Thus problems associated with pilot contamination in a massive MIMO environment is omitted or at least reduced.

According to a yet an additional aspect, a computer program product comprising a computer readable storage medium storing program code thereon for use by a radio network node is provided, for channel estimation of a channel used for wireless signal communication between a user equipment and the radio network node in a wireless communication system. The radio network node comprises a multiple antenna array configured for beamforming, spatial multiplexing and MIMO transmission, the program code comprising instructions for executing a method that comprises receiving a first pilot signal from the user equipment, and a wireless signal from an interferer and spatial analysing the received signals. Also, the method comprises selecting pilot signals from the user equipment, based on the spatial analysis. The method further comprises determining an angle of arrival for the selected pilot signals. In addition, the method furthermore comprises designing a receiver pre-filter, for isolating signals received from the determined angle of arrival. The method also comprises receiving a second pilot signal from the user equipment at the determined angle of arrival, filtered by the designed receiver pre-filter and estimating the channel, based on the received second pilot signal.

Improved channel estimation may thereby be made within the cell, as pilot signals from a user equipment may be filtered out and distinguished from wireless signals transmitted by an interferer. Thus problems associated with pilot contamination in a massive MIMO environment is omitted or at least reduced.

According to yet a further additional aspect, a coordinated multipoint scheme for orthogonal pilot signal scheduling between a plurality of neighbour radio network nodes in a wireless communication system is provided. The coordinated multipoint scheme for orthogonal pilot signal scheduling comprises a first subset of orthogonal pilot signals, to be used for spatial analysis by the radio network nodes, and a second subset of pilot signals, where each comprised pilot signal is distinct from any pilot signal comprised in the first subset of orthogonal pilot signals, to be used for channel estimation by the radio network nodes.

Improved channel estimation may thereby be made within the cell, as pilot signals from a user equipment may be filtered out and distinguished from wireless signals transmitted by an interferer. Thus problems associated with pilot contamination in a massive MIMO environment is omitted or at least reduced. Thereby an improved performance within the wireless communication system is provided, while the pilot contamination is reduced at the network side.

Other objects, advantages and novel features of the described aspects will become apparent from the following detailed description.

BRIEF DESCRIPTION OF DRAWINGS

Various embodiments are described in more detail with reference to attached drawings, illustrating various examples of embodiments in which.

DESCRIPTION OF EMBODIMENTS

Embodiments of the invention described herein are defined as a radio network node, a method in a radio network node, a computer program product and a coordinated multipoint scheme for orthogonal pilot signal scheduling, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
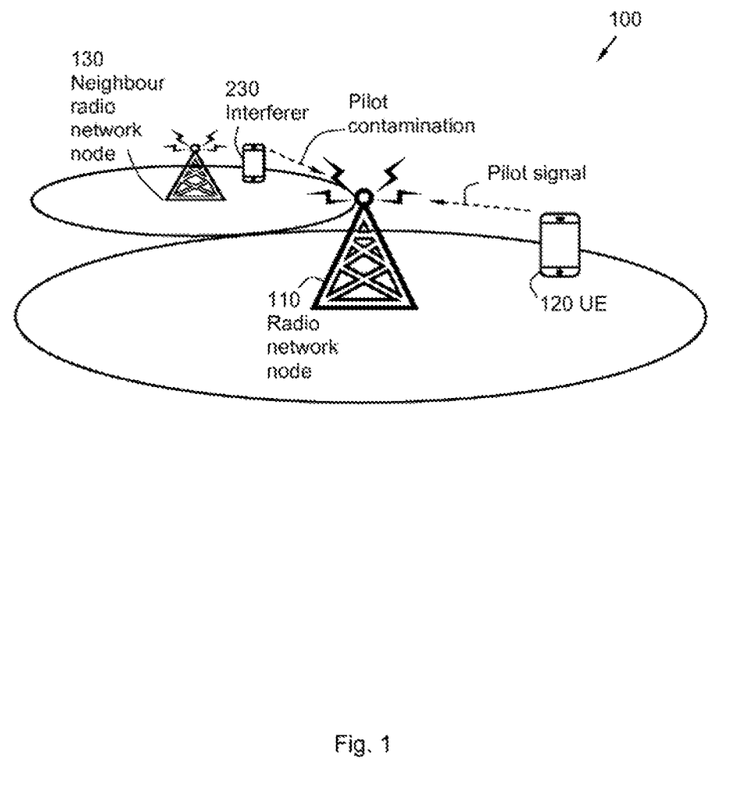
FIG. 1 is a block diagram illustrating a wireless communication network according to some embodiments.

FIG. 1 is a schematic illustration over a wireless communication network 100 comprising a radio network node 110, a neighbour radio network node 130, a user equipment 120 and an interferer 230, situated in the neighbour cell of the neighbour radio network node 130. The user equipment 120 may be served by the radio network node 110, thereby being connected to the wireless communication network 100.

The wireless communication network 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Spécial Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1× RTT and High Rate Packet Data (HRPD), just to mention some few options. The expressions "wireless communication network", "wireless communication system" and/or "cellular telecommunication system" may within the technological context of this disclosure sometimes be utilised interchangeably.

The wireless communication network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signalling. FDD means that the transmitter and receiver operate at different carrier frequencies.

The purpose of the illustration in FIG. 1 is to provide a simplified, general overview of the wireless communication network 100 and the involved methods and nodes, such as the radio network node 110, the neighbour network node 130, the user equipment 120 and the interferer 230 herein described, and the functionalities involved. The methods, radio network nodes 110, 130; the user equipment 120 and the interferer 230 will subsequently, as a non-limiting example, be described in a 3GPP LTE/LTE-Advanced environment. However the disclosed embodiments may operate in a wireless communication network 100 based on another access technology such as, e.g., any of the above already enumerated. Thus, although the embodiments of the invention are described based on, and using the lingo of, 3GPP LTE systems, it is by no means limited to 3GPP LTE. Further, the terms radio network node, network node, base station, and cell may be used interchangeably in the sequel.

The illustrated radio network node 110 comprised in the wireless communication network 100 may send and receive radio signals in order to communicate wirelessly with the user equipment 120.

The radio network node 110 may have knowledge about the neighbour network node 130, and time-frequency characteristics, such as periodicity, of transmitted DRS signals, or other reference signals, pilot signals or synchronization signals of the neighbour network node 130 e.g. by communicating with the neighbour network node 130 through an X2 connection, or another similar wired or wireless inter-network node communication interface.

In order to estimate the quality of the channel between the radio network node 110 and the user equipment 120, the user equipment 120 may send pilot signals in the uplink to be received by the radio network node 110.

It is to be noted that the illustrated network setting of one instance of the radio network node 110, one instance of the neighbour network node 130, one user equipment 120 and one interferer 230 in FIG. 1 is to be regarded as a non-limiting example of an embodiment only. The wireless communication network 100 may comprise any other number and/or combination of the discussed radio network nodes 110, 130, user equipments 120, and/or interferer 230. A plurality of user equipments 120 and/or interferers 230, and/or another configuration of radio network nodes 110, 130 may thus be involved in some embodiments of the disclosed invention. When reference is made herein to "the neighbour network node 130", the at least one neighbour network node 130 may comprise a set of a plurality of neighbour network nodes, according to some embodiments.

Thus whenever "one" or "a/an" radio network node 110, neighbour network node 130, user equipment 120 and/or interferer 230 is referred to in the present context, a plurality of the radio network nodes 110, neighbour network nodes 130, user equipment 120 and/or interferers 230 may be involved, according to some embodiments.

Further, the radio network node 110 and the neighbour network node 130, according to some embodiments, may be configured for downlink transmission and uplink reception, and may be referred to, respectively, as e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the user equipment 120 over a wireless interface, depending, e.g., of the radio access technology and/or terminology used.

The user equipment 120 and/or the interferer 230 may correspondingly be represented by, e.g. a wireless communication terminal, a mobile cellular phone, a Personal Digital Assistant (PDA), a wireless platform, a user equipment, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 110 and/or the neighbour network node 130, according to different embodiments and different vocabulary.

Some embodiments of the invention may define a modular implementation approach, and make it possible to reuse legacy systems such as e.g. standards, algorithms, implementations, components and products.

In wireless communication between the radio network node 110 and the user equipment 120, in particular during communication in non-line of sight, scattering and fading may occur. Fading is deviation of the attenuation affecting the transmitted signal. The fading may vary with time, geographical position and/or radio frequency.

Fading may be either due to multipath propagation, sometimes also referred to as multipath induced fading, or due to shadowing from obstacles affecting the wave propagation, sometimes referred to as shadow fading.

Further, the fading may be divided into large scale fading also known as slow fading, and small scale fading, also known as fast fading.

In large scale fading the amplitude and phase change imposed by the channel may be considered roughly constant over a period of time. In small scale fading, the amplitude and phase change imposed by the channel may vary considerably over the period of time.

According to some embodiments, a sparse coordinated scheduling of a limited set of pilot signals is introduced. It is thereby ensured that the same pilot signal is never transmitted on the same time and frequency slot of both wanted links, i.e. uplink signals from the user equipment 120 in the own cell, and unwanted link, i.e. uplink signals from the interferer 230 situated in the neighbour cell 120.

Inevitably this means training times may be too short to accurately estimate small scale fading of all wanted links. However, the training time will be enough to accurately estimate large scale fading. The small scale fading is essentially related to the geometry of the scenario, i.e. the angle and distance to scattering, transmitting and receiving objects in the environment.

To provide enough training time for small scale fading, some embodiments comprises extensive re-use of training sequences. Discrimination of unwanted signals, and thus elimination of pilot contamination, are done based on their large scale parameters, essentially angle of arrival which were acquired using an orthogonal allocation. Thereby, the same pilot signal is never transmitted on same time and frequency slot by the user equipment 120 and the interferer 230.

In some embodiments, the LTE standard may be used, and the large scale fading may be acquired using Sounding Reference Signals (SRS). The schedule may be flexible and may be done very sparse in some embodiments. Coordinated Multipoint schemes may comprise coordination of many parameters between different neighbouring radio network nodes 110, 130. In some embodiments, the SRS configuration may be coordinated in order to ensure an orthogonal SRS schedule between different neighbouring radio network nodes 110, 130. To get an accurate estimation of small scale fading, the Demodulation Reference Signals (DMRS) may be used with a high degree of re-use between neighbouring cells 110, 130, without risk of pilot contamination.

Figure 2:
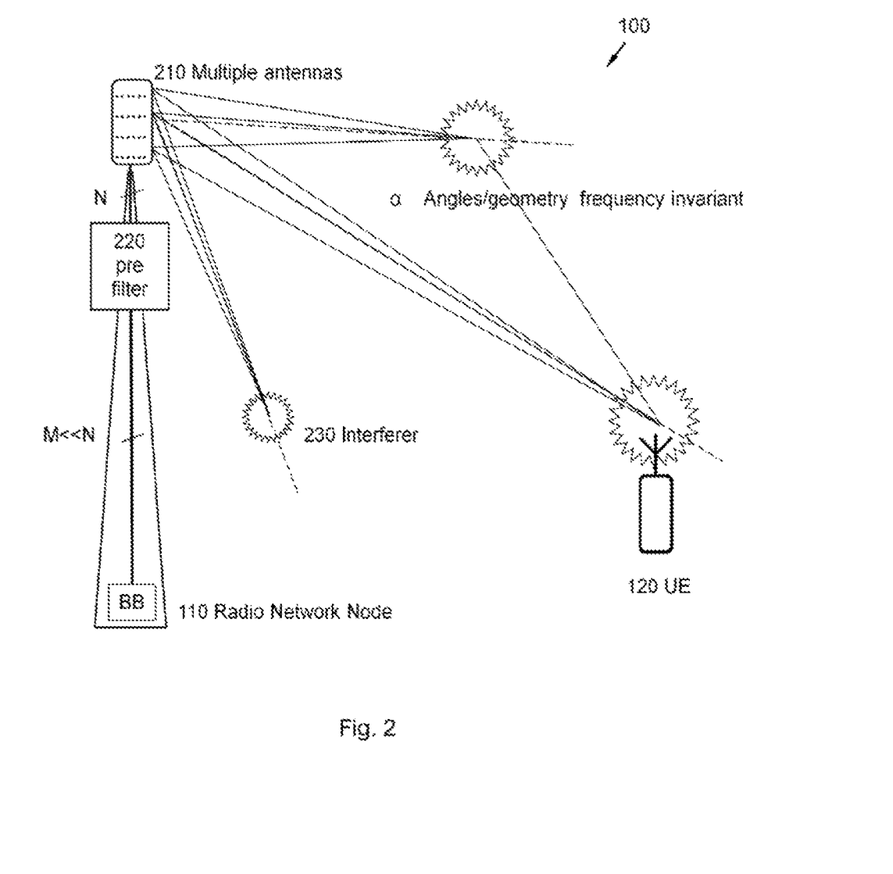
FIG. 2 is a block diagram illustrating a wireless communication network according to some embodiments.

FIG. 2 discloses an embodiment of the wireless communication network 100 comprising the radio network node 110 and the user equipment 120. The radio network node 110 comprises, or is connected to, a multiple antenna array 210; or antenna array as it also may be referred to as, which may be configured for massive MIMO. The multiple antenna array 210 comprises multiple antenna elements, such as e.g. 100 antenna elements, just to mention an example. The radio network node 110 further comprises a pre-filter 220, for mapping some significant clusters of signals to logical antennas. The number of logical antennas may be smaller, or much smaller, than the number of antenna elements comprised in the multiple antenna array 210. Signals received in the uplink may be received from the user equipment 120, or from an interferer 230. The interferer 230 may comprise another user equipment, or any other arbitrary device configured for transmission of wireless signals.

Signals received by the radio network node 110 in the uplink from the user equipment 120 and possibly from one or more interferers 230, may be divided into clusters, which clusters are either generating or scattering wireless signals. According to the previously made discussion concerning large scale fading, the cluster location may be considered frequency and time invariant, when the cluster is not moving. When the cluster is moving, it may be considered stationary for at least one or some Transmission Time Intervals (TTIs), which may be approximately e.g. 1, 2, 10, 20, 40 or 80 ms according to different standards and/or protocols; or some other similar time period comprising a subset, or multiple respectively, of any of the enumerated time periods.

As an illustrative example, it may be estimated that the user equipment 120, even when travelling at a rather speedy velocity of 300 m/s (1080 km/h) relative to the radio network node 110, moves approximately a modest 30 cm during one TTI (1 ms in LTE). The user equipment 120 may thereby be considered as stationary at least during that TTI, even when travelling at such rather extraordinary high velocity.

Beamforming and/or spatial multiplexing may be based on orthogonal propagation paths between the radio network node 110 and the user equipment 120 through these detected and selected clusters, sometimes referred to as rank M of the link. The rank M may typically be smaller, or much smaller than the number of antenna elements N comprised in the multiple antenna array 210. The rank M may be e.g. approximately 8, 16 or similar. In some embodiments, the multiple antenna array 210 may comprise at least ten times more antenna elements N than the rank M of the wireless communication network 100; i.e. may comprise e.g. 100 or more antenna elements in some embodiments. The clusters may carry any combination of desired signal and interference in some embodiments. Thus the rank M of the wireless communication network 100 also may comprise interferers 230.

Some embodiments may utilise the fact that the received signals on neighbouring elements of the multiple antenna array 210 are correlated. This correlation unveils the Angle of Arrival (AoA) of each individual propagation path arriving at the array. The AoA may sometimes be referred to as Direction of Arrival (DoA), or just "direction", of the received uplink signal.

AoA measurement is a method for determining the direction of propagation of a radio-frequency wave incident on the multiple antennas 210. AoA may be determined by measuring the Time Difference of Arrival (TDOA) at individual elements of the multiple antennas 210; and based on these delays the AoA may be calculated. Generally such TDOA measurement may comprise measuring the difference in received phase at each element in the multiple antenna array 210. This may be thought of as beamforming in reverse. In downlink beamforming, the signal from each element is delayed by some weight to steer the gain of the antenna array in relation to the particular user equipment 120. In AoA, the delay of arrival at each element may be measured directly and converted to an AoA measurement.

The number of propagation paths is related to the rank M of the wireless communication network 100, while the angular resolution of the wireless communication network 100 is defined by the number of antenna elements N, and their spacing. A spatial analysis and a selection of significant AoAs may be performed, i.e. angles with significant propagation paths, and a mapping of logical antennas to selected significant AoAs is established. As the AoAs essentially are constant in time and frequency as previously discussed, at least for a short period of time, the set of AoA may also be used for downlink Angle of Departures (AoD) in downlink transmission, in particular in FDD mode.

Further, in some embodiments, Visibility Range of Arrival (VRoA) may be determined. The Visibility Range of Arrival is a determination of which antenna elements in the multiple antenna array 210 that actually receives the uplink signal. Due to shading etc., the received signal may be received only on a subset of the antenna elements comprised in the multiple antenna array 210.

Thus, in some embodiments, the determined AoA and/or VRoA differences may be utilised to separate incoming signals spatially.

Utilising VRoA enables an improved separation of uplink signals in comparison with only using AoA. However, another advantage is that transmission of downlink signals intended for the user equipment 120 may be inhibited. It may thereby be avoided that signals are transmitted in vain from antenna elements that are shaded for the user equipment 120, which saves energy and reduces downlink interference for other user equipment within the cell.

The pre-filter design may be intended to be reused for both uplink reception and downlink transmission, regardless if the directions are separated by time (TDD in TDMA), frequency (FDD in FDMA), code (CDMA) or space, as may be the case in different embodiments.

Figure 3:
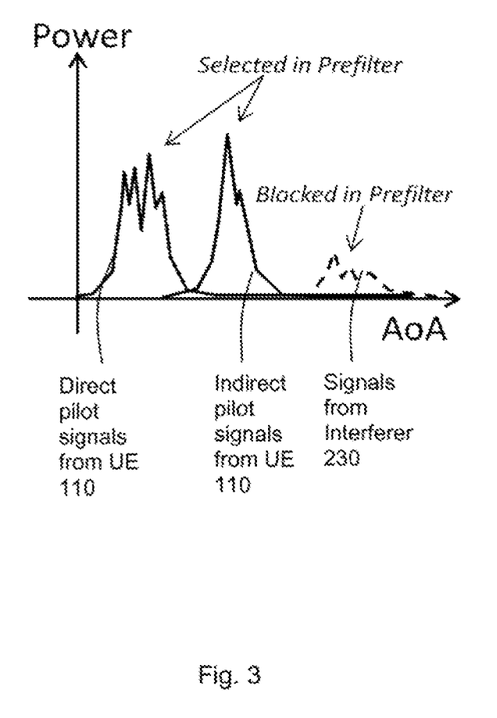
FIG. 3 is a diagram illustrating pilot signals.

FIG. 3 illustrates a diagram illustrating received pilot signals in an example, as received by the radio network node 110, in an embodiment.

In the arbitrary example illustrated in FIG. 2, the radio network node 110 receives a first uplink signal directly from the user equipment 120, a second uplink signal indirectly from the user equipment 120 and an uplink signal from the interferer 230.

According to some embodiments, the pre-filter 220 in the radio network node 110 may be configured to block the uplink signals received from the interferer 230. Thereby, the pilot signals from the user equipment 120 may be selected.

Thus, thanks to the disclosed method according to some embodiments, a sparse co-ordinated orthogonal pilot schedule, i.e. a first subset of available pilot resources, for large scale pilot contamination discrimination using the above described spatial pre-filter. Further, a dense un-coordinated not-so-orthogonal schedule i.e. a second subset of available pilot resources, not overlapping the first subset of available pilot resources, for small scale fading estimation.

Figure 4:
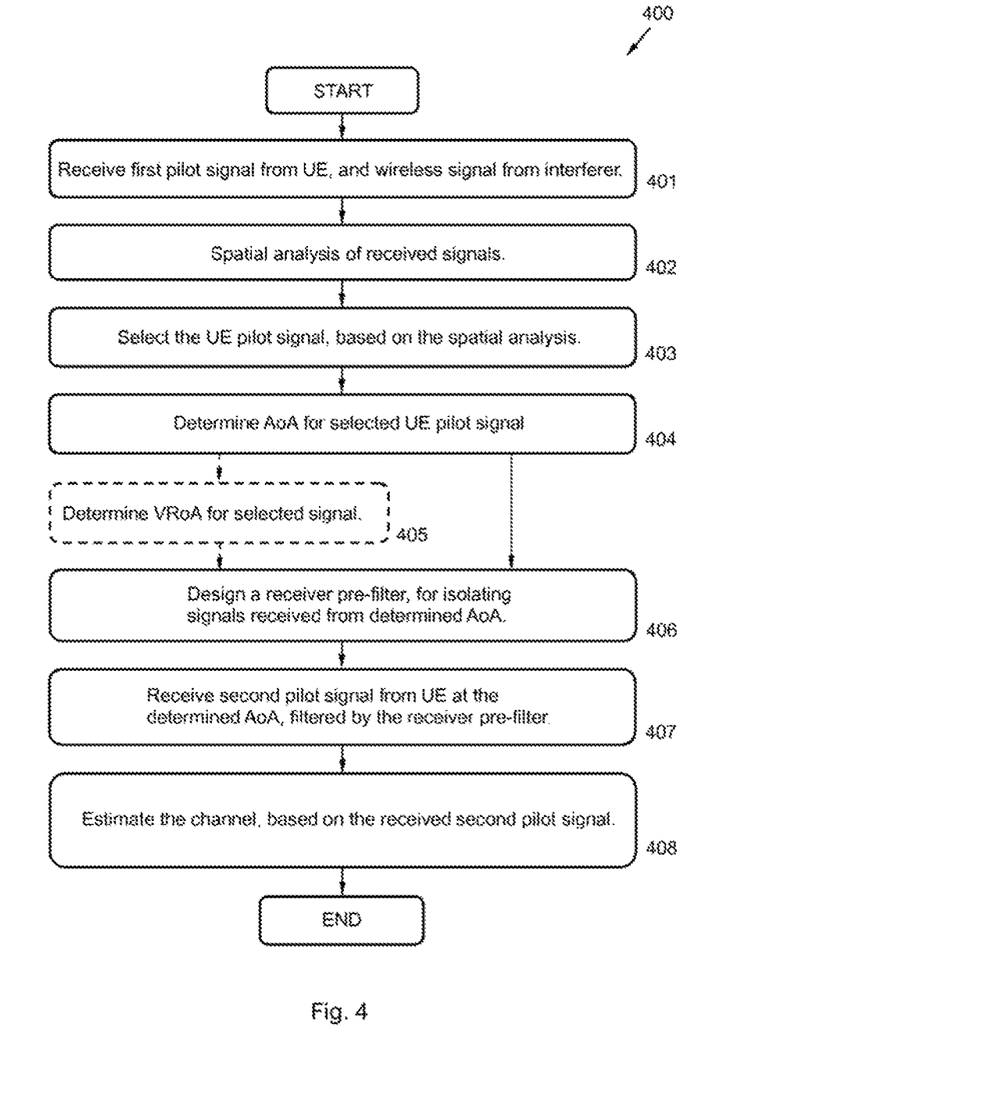
FIG. 4 is a flow chart illustrating a method in a radio network node according to an embodiment.

FIG. 4 is a flow chart illustrating embodiments of a method 400 for use in a radio network node 110, for channel estimation of a channel used for wireless signal communication between a user equipment 120 and the radio network node 110 in a wireless communication system 100. The radio network node 110 comprises a multiple antenna array 210 configured for beamforming, spatial multiplexing and MIMO transmission.

The multiple antenna array 210 may comprise a multitude of antenna elements, mounted at a distance from each other such that at least some of the antenna elements are able to receiving the same signal from the user equipment 120.

The user equipment 120 may be served by the radio network node 110 in a heterogeneous wireless communication system 100 comprising the radio network node 110 and at least one neighbour network node 130.

The wireless communication system 100 may be based on 3GPP LTE. Further, the wireless communication system 100 may be based on FDD or TDD in different embodiments. The radio network node 110 and/or the neighbour network node 130 may comprise an evolved NodeB (eNodeB) according to some embodiments.

To perform the channel estimation, the method 400 may comprise a number of actions 401-408. It is however to be noted that any, some or all of the described actions 401-408, may be performed in a somewhat different chronological order than the enumeration indicates, be performed simultaneously or even be performed in a completely reversed order according to different embodiments. Also, some actions such as e.g. actions 405 may be performed only within some alternative embodiments. Further, it is to be noted that some actions may be performed in a plurality of alternative manners according to different embodiments, and that some such alternative manners may be performed only within some, but not necessarily all embodiments. The method 400 may comprise the following actions:

Action 401

A first pilot signal is received from the user equipment 120, and a wireless signal is received from an interferer 230.

The first pilot signal may be received from the user equipment 120 over the multiple antenna array 210. The wireless signals may thus be uplink signals, received directly from the user equipment 120, or may be received indirectly from the user equipment 120 via scattering reflections. Further, the received wireless signals may be received from interferers 230, i.e. other user equipment within range but in another cell, and/or reflections from signals transmitted by other interferers 230/user equipment.

The first pilot signal of the user equipment 120 may be comprised in a set of orthogonal pilot signals coordinated between the radio network node 110 and a neighbour network node 130.

The first pilot signal of the user equipment 120 may be a Sounding Reference Signal (SRS) and the scheduling of the first pilot signal may be coordinated between the radio network node 110 and the neighbour network node 130.

Action 402

The received 401 signals are spatially analysed.

The spatial analysis of the received 401 signals may comprise a comparison of the received signal strength/quality with a predetermined threshold value, or a predetermined number of directions in some embodiments.

Action 403

The pilot signal received 401 from the user equipment 120 is selected, based on the spatial analysis 402.

In some embodiments, the signals having a signal strength/quality exceeding the predetermined threshold value may be selected.

Action 404

An angle of arrival for the selected 403 pilot signal is determined.

The AoAs may be determined by measuring the Time Difference of Arrival (TDOA) at individual antenna elements of the multiple antenna array 210, according to some embodiments.

Action 405

This action may be performed within some, but not necessarily all embodiments of the method 400.

The visibility range of arrival for the selected 403 pilot signal may be determined. Thereby it may be determined which antenna elements that are receiving the uplink signal.

According to some embodiments, it may be determined which antenna elements in the multiple antenna array 210, i.e. a subset of the multitude of antenna elements comprised in the multiple antenna array 210, that are receiving an uplink signal having a signal strength/quality exceeding a predetermined threshold value.

Action 406

A receiver pre-filter, for isolating signals received 401 from the determined 404 angle of arrival is designed.

The design of the receiver pre-filter may further be made for isolating pilot signals received 401 from the determined 405 visibility range of arrival in some embodiments.

The spatial pre-filtering may be regarded as a manipulation of the transmission channel. The channel may be regarded as a combination of the radio channel, antenna properties, transmitter properties (Analog and Digital) and the spatial pre-filter. Further, the pre-filter may be recalculated continuously, or at a predetermined time interval, such as e.g. every TTI, e.g. approximately every 1, 2, 10, 20, 40 or 80 ms, or some other similar time period. A Fast Fourier Transformation (FFT) may be made on the received signals.

Acquisition and discrimination of spatial profile may then be made. The acquisition may be blind, based on received signal, or based on a model such as a matched filter tuned for known reference signals according to different embodiments.

Explicit or implicit schedule information used for addressing of a pre-filter database, e.g. pairing received signal streams with transmitted signal streams. Further, a filtering may be made for filtering out weak signals. Thus received signals having a signal strength below a threshold value may be filtered out. The AoA of the remaining, selected signals may then be determined and a receiver pre-filter, for isolating signals received from the determined AoA, may be determined. The other signals/AoAs may be discarded. Further, a number of M antenna streams may be mapped on Angles of Departure AoDs, possibly adjusted for FDD distance in some embodiments.

The design of the receiver pre-filter may be based on blind estimations and/or statistics in some embodiments.

An advantage of using blind estimations/statistics may be that any received signals may be utilised for the pre-filtering.

The design of the receiver pre-filter may be model based, e.g. based on matched filter signal strength measurements on the first pilot signal received 401 from the user equipment 120.

An advantage of using a matched filter tuned for known reference signals such as pilot signals is that interferers 230 may be filtered out, according to some embodiments. Thereby, an improved signal quality of the signal received in the uplink from the user equipment 120 may be achieved.

Action 407

A second pilot signal is received from the user equipment 120 at the determined 404 angle of arrival, filtered by the designed 406 receiver pre-filter.

The second pilot signal may not be comprised in the set of orthogonal pilot signals coordinated between the radio network node 110 and a neighbour network node 130.

The second pilot signal of the user equipment 120 may be a demodulation reference signal (DMRS) or an SRS, which is not required to be coordinated between the radio network node 110 and the neighbour network node 130.

Action 408

The channel is estimated, based on the received 405 second pilot signal.

Figure 5:
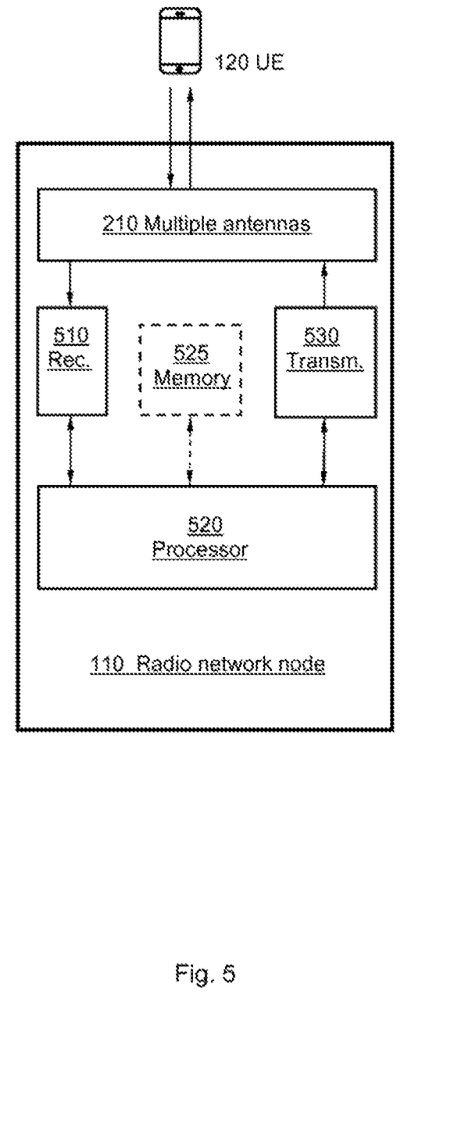
FIG. 5 is a block diagram illustrating a radio network node according to an embodiment.

FIG. 5 illustrates an embodiment of a radio network node 110, for channel estimation of a channel used for wireless signal communication between a user equipment 120 and the radio network node 110 in a wireless communication system 100.

The radio network node 110 comprises a multiple antenna array 210 configured for beamforming, spatial multiplexing and Multiple Input Multiple Output (MIMO) transmission. The multiple antenna array 210 may comprise a multitude of antenna elements, mounted at a distance from each other such that at least some of the antenna elements are able to receiving the same signal from the user equipment 120.

The radio network node 110 is further configured for wireless communication in a wireless communication system 100. The first network node 110 is also configured for performing the method 400 according to at least some of the previously described actions 401-408 for channel estimation of a channel used for wireless signal communication between a user equipment 120 and the radio network node 110 in a wireless communication system 100.

The user equipment 120 may be served by the radio network node 110 in a heterogeneous wireless communication system 100 comprising the radio network node 110 and possibly at least one other neighbour network node 130.

The wireless communication network 100 may be based on 3GPP LTE. Further, the wireless communication system 100 may be based on FDD or TDD in different embodiments. The radio network node 110 and/or the other neighbour network node 130 may comprise an evolved NodeB (eNodeB) according to some embodiments.

For enhanced clarity, any internal electronics or other components of the radio network node 110, not completely indispensable for understanding the herein described embodiments have been omitted from FIG. 5.

The radio network node 110 comprises a receiver 510, configured for receiving a first pilot signal from the user equipment 120, and a wireless signal from an interferer 230. The receiver 510 is also configured for receiving a second pilot signal from the user equipment 120 at a determined angle of arrival, filtered by a receiver pre-filter.

The first pilot signal of the user equipment 120 may be comprised in a set of orthogonal pilot signals coordinated between the radio network node 110 and a neighbour network node 130 in some embodiments. The second pilot signal may not be comprised in the set of orthogonal pilot signals coordinated between the radio network node 110 and a neighbour network node 130. In some embodiments, the second pilot signal of the user equipment 120 may be a demodulation reference signal, DMRS, or an SRS, which is not required to be coordinated between the radio network node 110 and the neighbour network node 130.

In some further embodiments, the first pilot signal of the user equipment 120 may be a Sounding Reference Signal (SRS) and wherein scheduling of the first pilot signal may be coordinated between the radio network node 110 and the neighbour network node 130.

Further, the radio network node 110 comprises a processor 520 configured for spatial analysing the received signals; and configured for selecting pilot signals from the user equipment 120, based on the spatial analysis. The processor 520 is additionally configured for determining an angle of arrival for the selected pilot signals. Furthermore, the processor is also configured for designing a receiver pre-filter, for isolating signals received from the determined angle of arrival. The processor 520 is also further configured for estimating the channel, based on the received second pilot signal.

The processor 520 may be further configured for determining visibility range of arrival for the selected signals. In addition, the processor 520 may be configured for designing the receiver pre-filter by isolating pilot signals received from the determined visibility range of arrival. The design of the receiver pre-filter may be based on blind estimations and/or statistics. Further, the design of the receiver pre-filter may be model based in some embodiments, e.g. based on matched filter signal strength measurements on the first pilot signal received from the user equipment 120.

Further, the processor 520 may also be configured for spatial analysing the received signals by comparing the received signal strength with a predetermined threshold value, and may in further addition be configured for selecting the signals having a signal strength exceeding the predetermined threshold value.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the radio network node 110 may further comprise at least one memory 525, according to some embodiments. The optional memory 525 may comprise a physical device utilised to store data or a program, i.e., a sequence of instructions, on a temporary or permanent basis. According to some embodiments, the memory 525 may comprise integrated circuits comprising silicon-based transistors. Further, the memory 525 may be volatile or non-volatile.

Some or all of the above described actions 401-408 to be performed in the radio network node 110 may be implemented through the one or more processors 520 in the radio network node 110, together with a computer program product for performing at least some of the functions of the actions 401-408. Thus a computer program comprising program code may perform a method 400 according to any, at least some, or all of the functions of the actions 401-408 for channel estimation of a channel used for wireless signal communication between a user equipment 120 and the radio network node 110 in a wireless communication system 100, which radio network node 110 comprises a multiple antenna array 210 configured for beamforming, spatial multiplexing and Multiple Input Multiple Output (MIMO) transmission. The program code comprises instructions for executing a method 400 that comprises receiving 401 a first pilot signal from the user equipment 120, and a wireless signal from an interferer 230. The method 400 may also comprise spatial analysing 402 the received 401 signals. In addition, the method 400 comprises selecting 403 pilot signals from the user equipment 120, based on the spatial analysis 402. Further, the method 400 comprises determining 404 an angle of arrival for the selected 403 pilot signals. The method 400 further comprises designing 406 a receiver pre-filter, for isolating signals received 401 from the determined 404 angle of arrival. In addition, the method 400 also comprises receiving 407 a second pilot signal from the user equipment 120 at the determined 404 angle of arrival, filtered by the designed 406 receiver pre-filter. The method 400 also comprises estimating 408 the channel, based on the received 405 second pilot signal. The method 400 may be performed when the program code is loaded into the processor 520 in the radio network node 110.

The computer program product mentioned above may be provided for instance in the form of a data carrier carrying computer program code for performing at least some of the actions 401-408 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the first network node 110 remotely, e.g., over an Internet or an intranet connection.

Furthermore, in some embodiments, a coordinated multipoint scheme for orthogonal pilot signal scheduling between a plurality of neighbour radio network nodes 110, 130 in a wireless communication system 100 is provided. The coordinated multipoint scheme for orthogonal pilot signal scheduling may comprise a first subset of orthogonal pilot signals, to be used for spatial analysis by the radio network nodes 110, 130. Also, the coordinated multipoint scheme for orthogonal pilot signal scheduling may comprise a second subset of pilot signals, where each comprised pilot signal is distinct from any pilot signal comprised in the first subset of orthogonal pilot signals, to be used for channel estimation by the radio network nodes 110, 130.

The terminology used in the description of the embodiments as illustrated in the accompanying drawings is not intended to be limiting of the described method 400; radio network node 110 and/or user equipment 120. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A radio network node, for channel estimation of a channel used for wireless signal communication between a user equipment and the radio network node in a wireless communication system, which radio network node comprises a multiple antenna array configured for beamforming, spatial multiplexing and Multiple Input Multiple Output, MIMO, transmission, wherein the radio network node further comprises:
a receiver, configured for receiving a first pilot signal from the user equipment, and a wireless signal from an interferer; and also configured for receiving a second pilot signal from the user equipment at a determined angle of arrival, filtered by a receiver pre-filter; and
a processor configured for spatial analysing the received signals; and configured for selecting pilot signals from the user equipment, based on the spatial analysis; and additionally configure for determining an angle of arrival for the selected pilot signals; and furthermore configured for designing a receiver pre-filter, for isolating signals received from the determined angle of arrival; and also further configured for estimating the channel, based on the received second pilot signal.

2. The radio network node according to claim 1, wherein the processor also is configured for determining visibility range of arrival for the selected signals; and also configured for designing the receiver pre-filter by isolating pilot signals received from the determined visibility range of arrival.

3. The radio network node according to claim 1, wherein the processor also is configured for spatial analysing the received signals by comparing the received signal strength with a predetermined threshold value, and also configured for selecting the signals having a signal strength exceeding the predetermined threshold value.

4. The radio network node according to claim 1, wherein the first pilot signal of the user equipment is comprised in a set of orthogonal pilot signals coordinated between the radio network node and a neighbour network node, and the second pilot signal is not comprised in the set of orthogonal pilot signals coordinated between the radio network node and a neighbour network node.

5. The radio network node according to claim 1, wherein the first pilot signal of the user equipment is a Sounding Reference Signal (SRS) and wherein scheduling of the first pilot signal is coordinated between the radio network node and the neighbour network node; and wherein the second pilot signal of the user equipment is a demodulation reference signal (DMRS) or an SRS, which is not required to be coordinated between the radio network node and the neighbour network node.

6. The radio network node according to claim 1, wherein the design of the receiver pre-filter is based on blind estimations and/or statistics.

7. The radio network node according to claim 1, wherein the design of the receiver pre-filter is model based, e.g. based on matched filter signal strength measurements on the first pilot signal received from the user equipment.

8. The radio network node according to claim 1, wherein the multiple antenna array comprises a multitude of antenna elements, mounted at a distance from each other such that at least some of the antenna elements are able to receiving the same signal from the user equipment.

9. The radio network node according to claim 1, wherein the radio network node comprises an evolved NodeB, eNodeB; and wherein the wireless communication network is based on 3rd Generation Partnership Project Long Term Evolution (3GPP LTE).

10. A method in a radio network node, for channel estimation of a channel used for wireless signal communication between a user equipment and the radio network node in a wireless communication system, which radio network node comprises a multiple antenna array configured for beamforming, spatial multiplexing and Multiple Input Multiple Output (MIMO) transmission, the method comprising:
receiving a first pilot signal from the user equipment, and a wireless signal from an interferer;
spatial analysing the received signals;
selecting the pilot signal from the user equipment, based on the spatial analysis;
determining an angle of arrival for the selected pilot signal;

designing a receiver pre-filter, for isolating signals received from the determined angle of arrival;

receiving a second pilot signal from the user equipment at the determined angle of arrival, filtered by the designed receiver pre-filter; and estimating the channel, based on the received second pilot signal.

11. The method according to claim 10, further comprising:

determining visibility range of arrival for the selected pilot signal; and wherein the design of the receiver pre-filter is further made for isolating pilot signals received from the determined visibility range of arrival.

12. A non-transitory computer readable storage medium storing program code thereon for use by a radio network node for channel estimation of a channel used for wireless signal communication between a user equipment and the radio network node in a wireless communication system, which radio network node comprises a multiple antenna array configured for beamforming, spatial multiplexing and Multiple Input Multiple Output (MIMO) transmission, the program code comprising instructions for executing a method that comprises:

receiving a first pilot signal from the user equipment, and a wireless signal from an interferer;

spatial analysing the received signals;

selecting pilot signals from the user equipment, based on the spatial analysis;

determining an angle of arrival for the selected pilot signals;

designing a receiver pre-filter, for isolating signals received from the determined angle of arrival;

receiving a second pilot signal from the user equipment at the determined angle of arrival, filtered by the designed receiver pre-filter; and estimating the channel, based on the received second pilot signal.

13. A method of orthogonal pilot signal scheduling between a plurality of neighbour radio network nodes in a wireless communication system, comprising:

conducting spatial analysis, by at least one of the plurality of neighbour radio network nodes, on a first subset of orthogonal pilot signals transmitted between the plurality of neighbour radio network nodes including a pilot signal transmitted by a user equipment in the wireless communication system;

conducting channel estimation, by the at least one of the plurality of neighbour radio network nodes, on a second subset of pilot signals, wherein each comprised pilot signal is distinct from any pilot signal comprised in the first subset of orthogonal pilot signals; and communicating, by the at least one of the plurality of neighbour radio network nodes, with the user equipment in the wireless communication system based upon the spatial analysis conducted on the first subset of orthogonal pilot signals and the channel estimation based on the second subset of pilot signals.

* * * * *